(12) United States Patent
Ishii et al.

(10) Patent No.: US 8,243,647 B2
(45) Date of Patent: Aug. 14, 2012

(54) RADIO ACCESS CONTROL APPARATUS, MOBILE STATION AND METHOD

(75) Inventors: Minami Ishii, Yokohama (JP); Anil Umesh, Yokohama (JP); Sadayuki Abeta, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 878 days.

(21) Appl. No.: 11/997,711

(22) PCT Filed: Jul. 31, 2006

(86) PCT No.: PCT/JP2006/315147
§ 371 (c)(1),
(2), (4) Date: Aug. 4, 2008

(87) PCT Pub. No.: WO2007/015460

PCT Pub. Date: Feb. 8, 2007

(65) Prior Publication Data
US 2010/0056164 A1    Mar. 4, 2010

(30) Foreign Application Priority Data
Aug. 2, 2005    (JP) ................... 2005-224720

(51) Int. Cl.
*H04B 7/14*    (2006.01)
*H04W 68/00*    (2009.01)
(52) U.S. Cl. ...................... 370/315; 455/458
(58) Field of Classification Search ............. None
See application file for complete search history.

(56) References Cited

U.S. PATENT DOCUMENTS

| | | | |
|---|---|---|---|
| 2005/0064880 A1* | 3/2005 | Butler et al. | 455/458 |
| 2005/0180385 A1* | 8/2005 | Jeong et al. | 370/350 |
| 2005/0277429 A1* | 12/2005 | Laroia et al. | 455/458 |

FOREIGN PATENT DOCUMENTS

| | | |
|---|---|---|
| JP | 5-91033 | 4/1993 |
| JP | 9-65423 | 3/1997 |
| JP | 2000-69523 | 3/2000 |

OTHER PUBLICATIONS

International Search Report (Japanese and English) for PCT/JP2006/315147 mailed Oct. 31, 2006 (7 pages).
Written Opinion (Japanese) of International Searching Authority mailed Oct. 31, 2006 (3 pages).
"W-CDMA Mobile Communications System" Author: Keiji Tachikawa pp. 222-223 published Jun. 25, 2001.
3rd Generation Partnership Project; Technical Specification Group Radio Access Network; TS 25.211 V6.5.0; "Physical channels and mapping of transport channels onto physical channels (FDD)" Jun. 2005 (49 pages).

* cited by examiner

*Primary Examiner* — John Blanton
(74) *Attorney, Agent, or Firm* — Osha Liang LLP

(57) ABSTRACT

A radio access network apparatus includes: a discontinuous reception management unit configured to manage a reception state (a discontinuous reception state or a continuous reception state) for each of one or more mobile stations; a determination and announcement unit configured to determine and announce a correspondence relationship between a discontinuous reception channel and a shared data channel for each mobile station; and a scheduling unit configured to perform scheduling of a downlink shared data channel, wherein, when a paging signal to the mobile station in the discontinuous reception state occurs, the radio access network apparatus transmits the paging signal to the mobile station using the shared data channel determined based on the correspondence relationship.

6 Claims, 6 Drawing Sheets

RADIO ACCESS CONTROL APPARATUS, MOBILE STATION AND METHOD

TECHNICAL FIELD

The present invention relates to a radio access control apparatus, a mobile station and a method.

BACKGROUND ART

There are various constraints in mobile stations used for a mobile communication system such as an INT 2000 system in that the mobile stations need to be small and lightweight, and to operate using a battery. Therefore, the mobile station in a standby state discontinuously performs operation for receiving signals from a base station to save power consumption (battery saving). More particularly, the discontinuous reception operation in the mobile station is performed under two stages.

FIG. 1 schematically shows a channel used for the discontinuous reception. In a first stage of the discontinuous reception operation, as shown in FIG. 1, the mobile station discontinuously receives PICH (Paging Indicator Channel). The cycle DRX for reception may be a value such as 640 ms, for example. The PICH periodically includes many paging indicators (PI) of a short period of 0.1 ms, for example. PIs are grouped into a plurality of groups, and they are indicated as P1, P2, ..., Pq, ... in FIG. 1. The mobile station discontinuously receives signals based on the timing of PI related to the own mobile station. PI indicates whether a paging signal addressed to the mobile station is occurring. The mobile station demodulates the PI, determines presence or absence of the paging signal addressed to the own station, and when it does not exist, the mobile station continues discontinuous signal reception of PI at next PI timing.

When there is the paging signal addressed to the own mobile station, the stage of the mobile station moves to a second stage of discontinuous reception. In the second stage, the mobile station receives the paging signal itself. The paging signal is transmitted using a transport channel PCH (Paging Channel) that is mapped to a physical channel SCCPCH (Secondary Common Control Physical Channel). The PCH is received over a relatively long period such as 10 ms, for example. The SCCPCH is associated with PICH such that time difference between them is τPICH. More particularly, the paging signal includes a paging request to the mobile station. The mobile station returns a paging response in response to the paging request, and after that, downlink data transmission starts. Conventional discontinuous reception method is described in the non-patent document 1, for example.

[non-patent document 1] Keiji Tachikawa (supervision), "W-CDMA mobile communication scheme", MARUZEN, pp. 222-223

DISCLOSURE OF THE INVENTION

Problem to be Solved by the Invention

In such a conventional method, the base station needs to continuously transmit PICH irrespective of presence or absence of incoming call to the mobile station (irrespective of whether there is a paging signal addressed to the mobile station or not). Therefore, code and power for PICH are continuously used. In addition, it is necessary that resources (spread code and the like, for example) for SCCPCH associated with PICH are kept beforehand. Therefore, there is a problem in that much resources need to be kept beforehand.

In addition, in the above-mentioned discontinuous reception scheme, processes of two stages are performed for achieving efficient battery saving. However, as a result of that, procedure and process contents for discontinuous reception become complicated, so that there is a problem in that apparatus configuration and calculation load become large. In addition, incoming information is transmitted to the mobile station only after changing to a dedicated channel such as a dedicated physical channel (DPCH) after performing reception process for common control channels such as PICH and SCCPCH. Such channel switching also is a factor for increasing complexity of the process for paging the mobile station.

The present invention is contrived for addressing at least one of the above-mentioned problems, and an object of the present invention is to provide a radio access network apparatus, a mobile station and a method for improving use efficiency of radio resources and simplifying paging of the mobile station.

Means for Solving the Problem

According to a characteristic of the present invention, a correspondence relationship between a discontinuous reception channel and a shared data channel is determined by a radio access network apparatus for each mobile station, and the correspondence relationship is announced to the mobile station. When a paging signal to a mobile station in a discontinuous reception state occurs, the paging signal is transmitted to the mobile station using a shared data channel determined based on the correspondence relationship. When the mobile station receives the paging signal, the mobile station is changed to a state in which the mobile station continuously receives the shared data channel.

Effect of the Invention

According to an embodiment of the present invention, use efficiency for radio resources can be improved and paging of the mobile station can be simplified.

DESCRIPTION OF REFERENCE SIGNS

Figure 1:
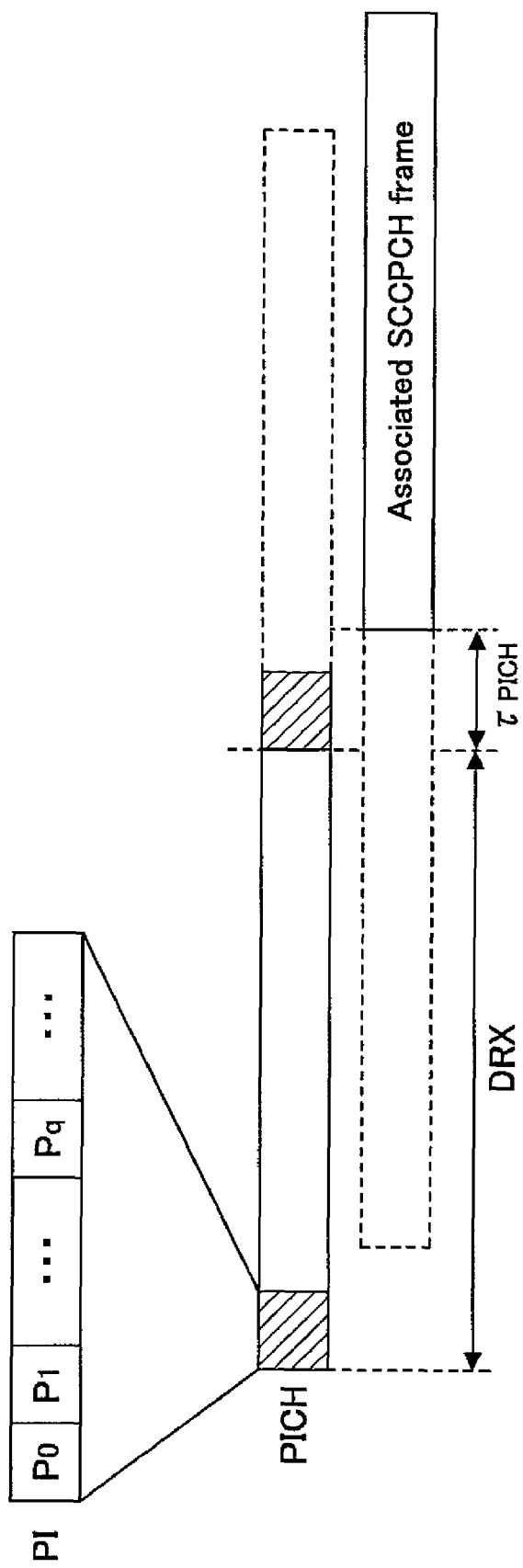
FIG. 1 is a figure showing a channel used for discontinuous reception.

100 mobile station
102 data transmit and receive unit
104 shared data channel demodulation unit 106 data presence or absence decision unit
200 radio access network apparatus
202 transmission unit
204 shared data channel control unit
206 discontinuous reception channel announcement unit
210 discontinuous reception management unit
212 discontinuous reception channel determination unit
220 radio control apparatus
230 radio base station apparatus

PREFERRED EMBODIMENTS FOR CARRYING OUT THE INVENTION

According to an embodiment of the present invention, a radio access network apparatus is used, radio access network apparatus including: a discontinuous reception management unit configured to manage whether each of one or more mobile stations is in a discontinuous reception state; a determination and announcement unit configured to determine and announce a correspondence relationship between a discontinuous reception channel and a shared data channel for each mobile station; and a scheduling unit configured to perform scheduling of a downlink shared data channel. When a paging signal to the mobile station in the discontinuous reception state occurs, the radio access network apparatus transmits the paging signal to the mobile station using the shared data channel determined based on the correspondence relationship. Accordingly, when the paging signal occurs, the paging signal can be transmitted with one stage without performing processes of two stages.

When the paging signal to the mobile station in the discontinuous reception state is not occurring, the shared data channel associated with the mobile station based on the correspondence relationship may be used for transmission to another mobile station. That is, the shared data channel associated with the mobile station is used for transmission to the mobile station only when there is the paging signal to the mobile station. When there is not the paging signal, the shared data channel may be used for another mobile station. Accordingly, use efficiency of radio resources can be largely improved.

The radio access network apparatus may include a radio network controller and a radio base station, and the scheduling unit may be provided in the radio base station. It is desirable to provide the scheduling unit near the mobile station from the viewpoint to decrease delay time for data transmission as much as possible.

According to an embodiment of the present invention, a mobile station that communicates with the radio access network is used. The mobile station includes a data reception unit configured to discontinuously receive a signal in a standby state; and a determination unit configured to determine whether a signal that is received discontinuously includes a paging signal addressed to the mobile station. The discontinuous signal reception is performed using a shared data channel specified by a notification signal from the radio access network. Accordingly, since the mobile station in the standby state performs reception using the shared data channel even when performing discontinuous reception, it is not necessary to switch conversation channels so that control load can be decreased and the apparatus configuration can be simplified.

According to an embodiment of the present invention, irrespective of whether the paging signal to the mobile station is actually transmitted from the radio access network apparatus, the mobile station receives and demodulates a specified shared data channel at specified frequency. Therefore, from the viewpoint of battery saving, the consumed power is not necessarily limited to be minimum. However, when the transmission time interval (TTI) of the shared data channel from the radio access network apparatus is properly short, the power consumption amount does not become so large. For example, according to a conventional scheme, the mobile station receives a paging indicator of a short period of about 0.1 ms with a discontinuous reception cycle such as several hundreds ms, and the mobile station receives the paging signal for a relatively long time of about 10 ms only when there is the paging signal. However, if the paging signal is transmitted using the shared data channel in a short period of about 0.5 ms, the mobile station does not consume so large power even though the mobile station receives and demodulates the shared data channel for each discontinuous reception cycle. Instead of performing reception processes of two stages in which the paging signal is actually received only after determining presence or absence of paging, it is desirable, for simplifying reception processes, that reception of own and other paging signals is performed with one stage of each discontinuous reception cycle.

Embodiment

Figure 2:
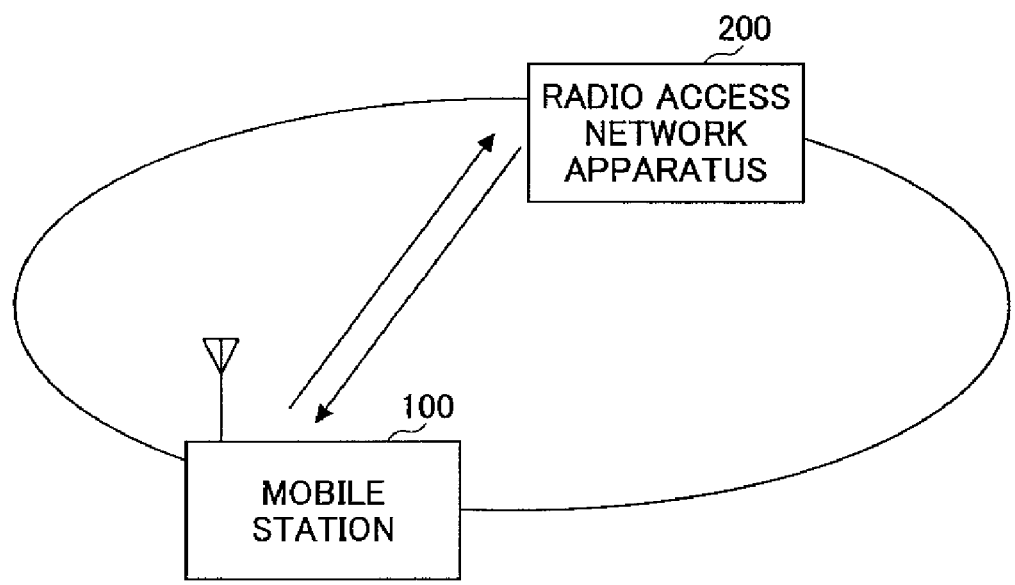
FIG. 2 shows a mobile communication system according to an embodiment of the present invention.

FIG. 2 shows a mobile communication system according to an embodiment of the present invention. FIG. 2 shows a mobile station 100 and a radio access network apparatus 200. The mobile station 100 and the radio access network apparatus 200 can perform wireless communication with each other using at least a shared data channel. In the example shown in the figure, the radio access network apparatus 200 is shown such that it directly communicates with the mobile station 100 by radio. However, one or more radio base stations for performing radio communication with the mobile station 100 may be prepared so that they may be controlled by the radio access network apparatus.

Figure 3:
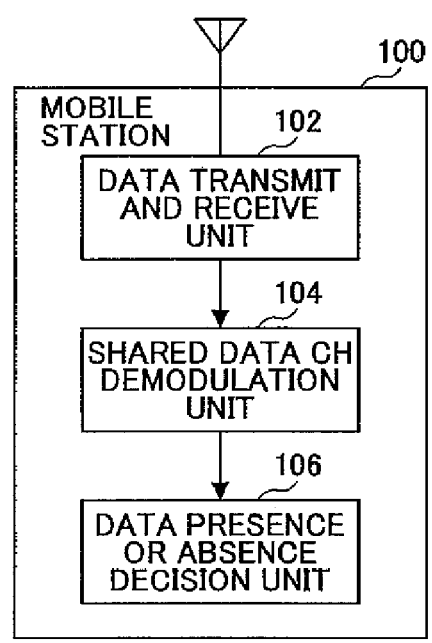
FIG. 3 shows a functional block diagram of a mobile station according to an embodiment of the present invention.

FIG. 3 shows a functional block diagram of a mobile station 100 according to an embodiment of the present invention. The mobile station 100 includes a data transmit and receive unit 102, a shared data channel demodulation unit 104 connected to the data transmit and receive unit 102, and a data presence or absence decision unit 106 connected to the data channel demodulation unit 104.

The data transmit and receive unit 102 discontinuously receives signals via an antenna in a standby state. A channel for transmitting the receiving signal is a shared data channel specified by a notification signal from the radio access network apparatus 200.

The shared data channel demodulation unit 104 demodulates a received shared data channel signal.

The data presence or absence decision unit 106 determines whether the demodulated shared data channel signal includes traffic data addressed to the own mobile station.

Figure 4:
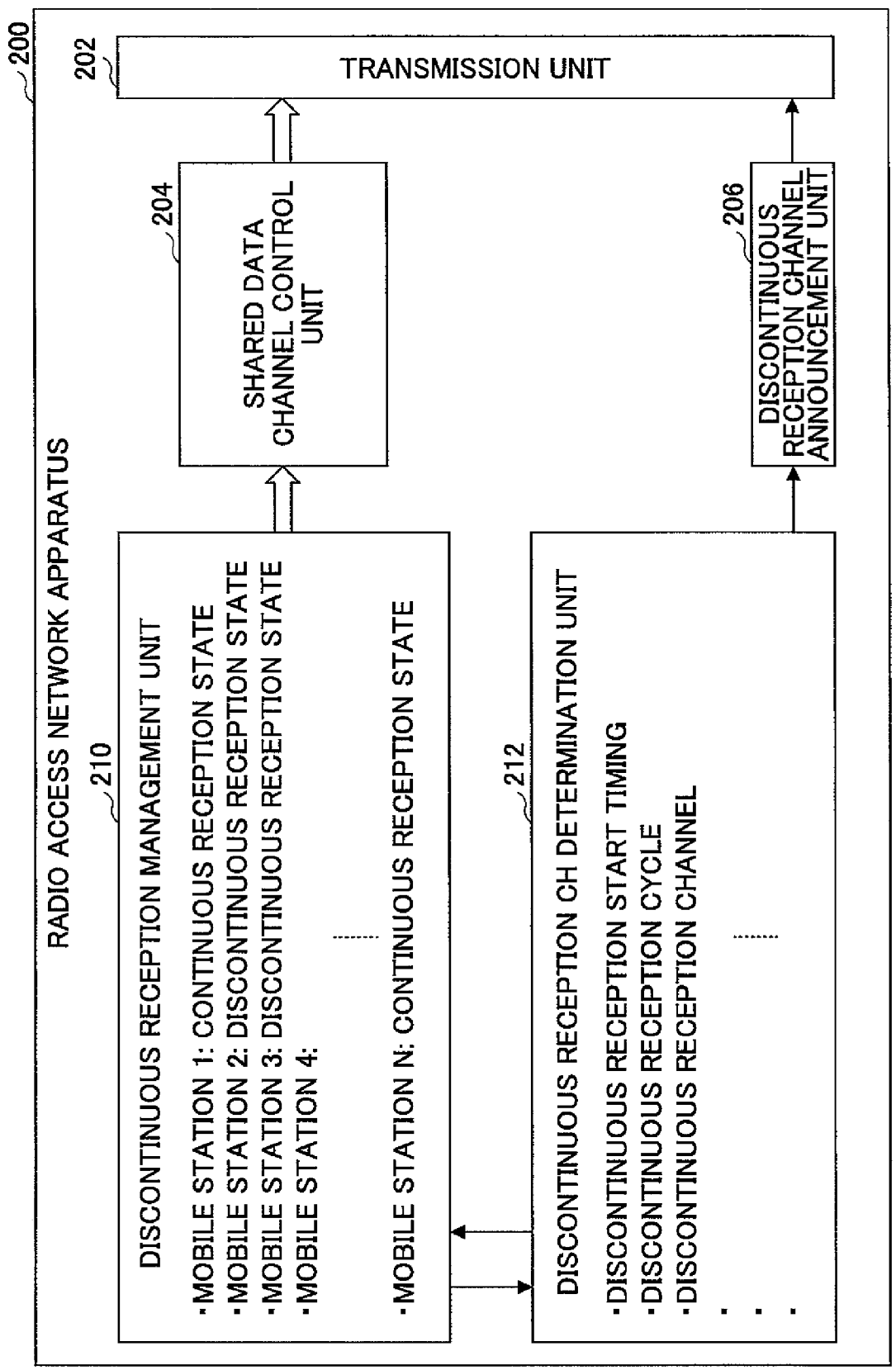
FIG. 4 is a figure showing a radio access network apparatus according to an embodiment of the present invention.

FIG. 4 shows a radio access network apparatus according to an embodiment of the present invention. The radio access network apparatus 200 includes a transmission unit 202, a shared data channel control unit 204, a discontinuous reception channel announcement unit 206, a discontinuous reception management unit 210 and a discontinuous reception channel determination unit 212.

The discontinuous reception management unit 210 manages a state (continuous reception state or discontinuous reception state) of each mobile station. In addition, the discontinuous reception management unit 210 may be configured so as to instruct, to the mobile state, a state (continuous reception state or discontinuous reception state) which the mobile station should take. The mobile station in the continuous reception state is in a state in which the mobile station can perform communication continuously. The mobile station of the discontinuous reception state is in a standby state so as to monitor a signal from the radio base station or the radio network apparatus discontinuously.

The discontinuous reception channel determination unit 212 manages discontinuous reception timing, discontinuous reception cycle, and channels used for discontinuous reception, and the like. The discontinuous reception channel determination unit 212 announces, to each mobile station, discontinuous reception timing, discontinuous reception cycle, what channel can be used for discontinuous reception, and the like. By the way, it is not essential that all of these are determined for each mobile station. For example, the discontinuous reception cycle may be fixed to a value. In the present embodiment, the discontinuous reception channel that the mobile station discontinuously receives is the shared data channel, which is different from the conventional method.

The discontinuous reception channel determination unit 212 further manages correspondence relationship between each of mobile stations in the discontinuous reception state and a discontinuous reception channel. As a matter of course, this correspondence relationship is determined such that channel conflict among the mobile stations in the discontinuous reception state does not occur. But, when the number of paging mobile stations is large, it is possible to assign a same channel to a plurality of mobile stations. As an example, when the number of mobile stations is small, for the mobile stations #1, #2 and #3 in the discontinuous reception state, a shared data channel A is assigned to the mobile station #1, a shared data channel B is assigned to the mobile station #2 and a shared data channel C is assigned to the mobile station #3. All of shared data channels that can be used simultaneously in the system can be used as discontinuous reception channels, or only a part of the shared data channels may be defined to be used as discontinuous reception channels.

The discontinuous reception channel determination unit 212 reports the determined discontinuous reception channel, discontinuous reception timing, cycle of discontinuous reception and the like to the discontinuous reception management unit 210 so that they can be stored with states for each mobile station.

The discontinuous reception channel announcement unit 206 announces information of the discontinuous reception channel and the like determined in the discontinuous reception channel determination unit 212 to the mobile station in the discontinuous reception state. The announcement may be performed any times, or the announcement may be performed only once when the mobile station changes to the discontinuous reception state.

The shared data channel control unit 204 performs scheduling for downlink shared data channels. As to data transmission for a mobile stations in the continuous reception state, scheduling is performed based on priority or data amount of mobile stations. For example, a mobile station having a propagation route of good communication quality may perform data transmission in priority to other mobile stations. As to data transmission for a mobile station in the discontinuous reception state, scheduling is performed such that, when a paging signal to the mobile station occurs, the paging signal is transmitted using a shared data channel associated with the mobile station. This scheduling is determined according to timing and the cycle of discontinuous reception determined in the discontinuous reception channel determination unit 212. When there is no paging signal to the mobile station, scheduling for the shared data channel for the mobile station is not performed. For example, assuming that a shared data channel A is assigned to a mobile station #1 in the discontinuous reception state like the above-mentioned correspondence relationship example. When a paging signal to the mobile station #1 occurs, the paging signal is sent to the mobile station #1 at a timing for the mobile station #1 using the shared data channel A. When a paging signal to the mobile station #1 is not occurring, the shared data channel A may be used for data transmission for another mobile station.

Figure 5:
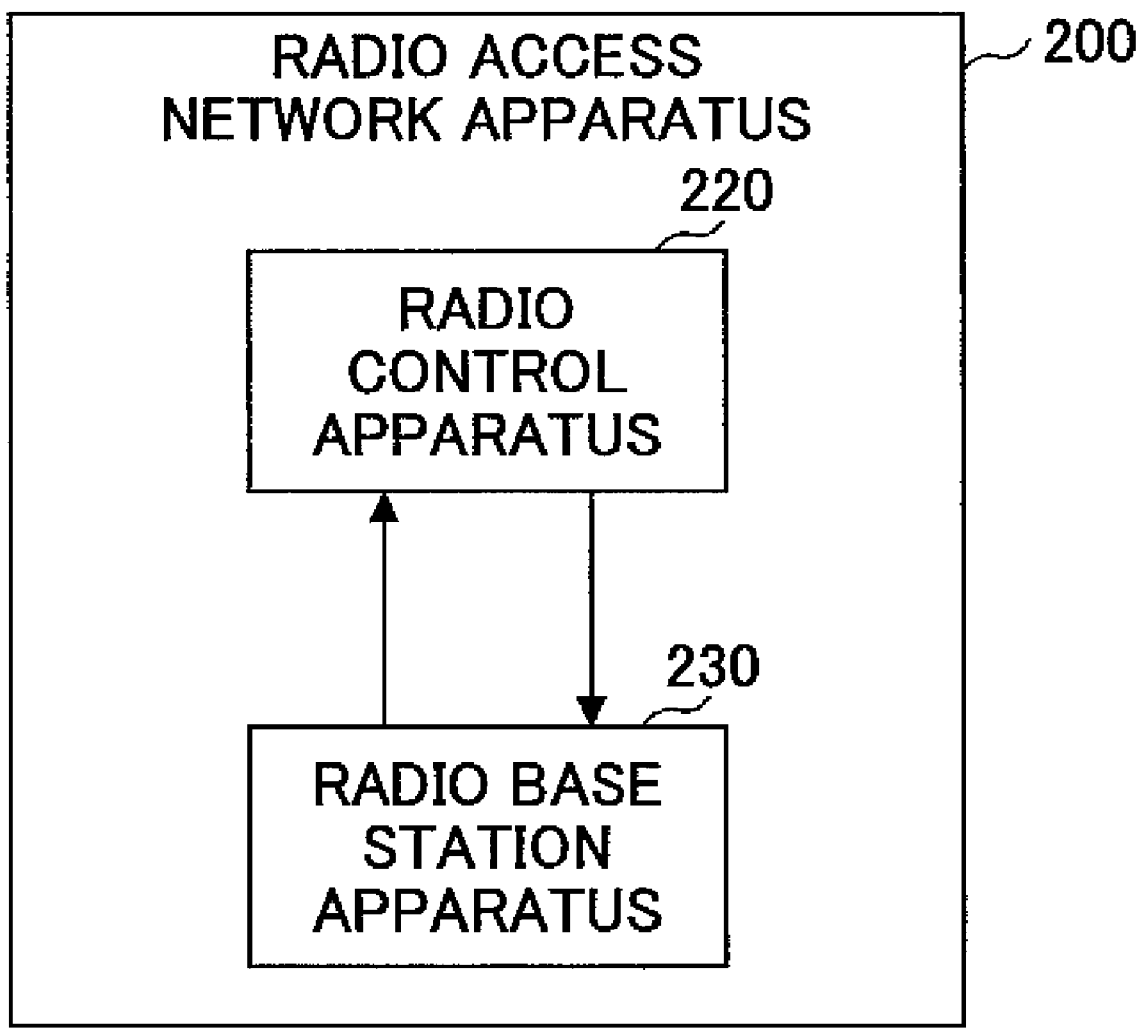
FIG. 5 is a figure showing a configuration example of a radio access network according to an embodiment of the present invention.

In the present embodiment, for the sake of convenience for explanation, as shown in FIG. 5, the radio access network apparatus 200 includes a function of a radio control apparatus 220 and a function of a radio base station 230. However, the radio control apparatus 220 and the radio base station 230 may be prepared separately. In any cases, from a viewpoint for decreasing delay time associated with data transmission, it is desirable that the shared data channel control unit 204 is provided in the radio base station apparatus 230. This is because the shared data channel control unit 204 that performs scheduling is provided at a position as close as possible to the mobile station.

Figure 6:
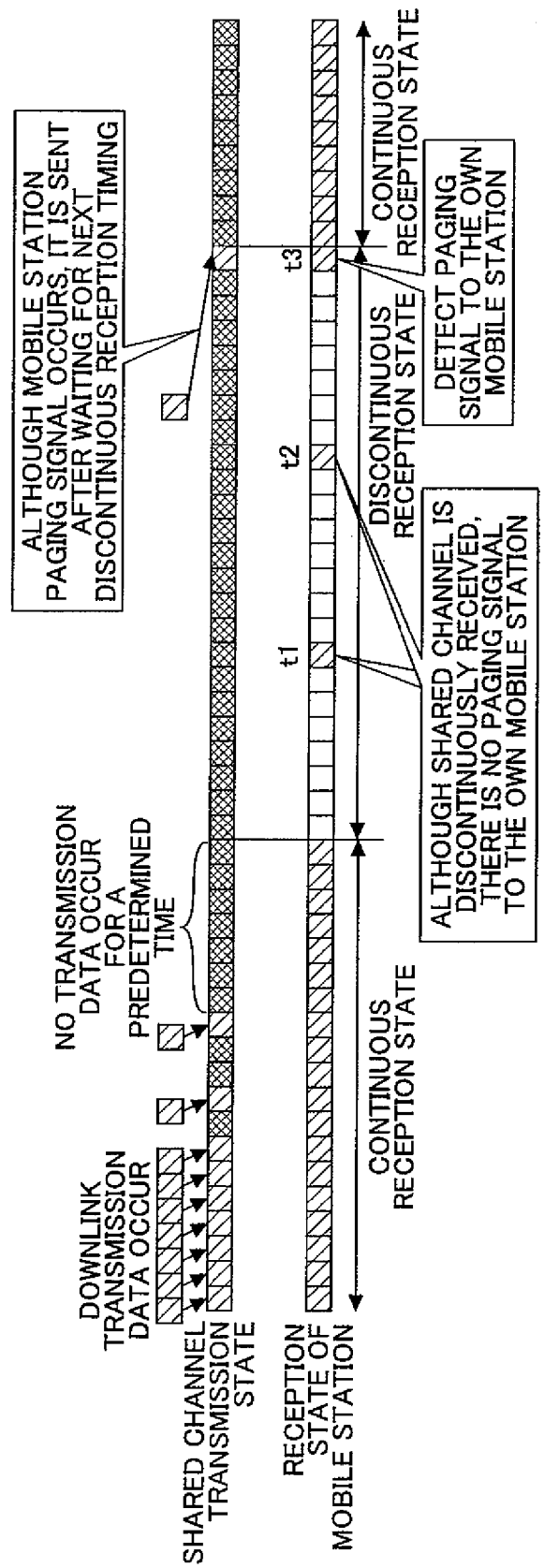
FIG. 6 is a schematic diagram showing a mobile station paging method according to an embodiment of the present invention.

FIG. 6 is a schematic diagram showing a paging method of the mobile station according to an embodiment of the present invention. In the figure, a time axis is assumed to exist in the left and right directions. Assuming that a particular mobile station 100 changes from a continuous reception state to a discontinuous reception state, and after that, changes to a continuous reception state again. The radio access network apparatus 200 is transmitting shared data channels to some mobile stations (including the mobile station 100 and other mobile stations). When the mobile station 100 is in the continuous reception state, the mobile station 100 continuously receives and demodulates a shared data channel. In the discontinuous reception state, the mobile station 100 discontinuously receives a specified discontinuous reception channel (specified shared data channel) based on timing or cycle (at t1, t2, t3 in the example shown in the figure) specified by the radio access network apparatus 200. The mobile station in the discontinuous reception state performs neither reception nor demodulation of a signal at timing other than t1, t2 and t3.

The mobile station determines whether a demodulated discontinuous reception signal includes a paging signal addressed to the own mobile station. In the example shown in the figure, since the paging signal addressed to the mobile station 100 is not included in signals demodulated at timings of t1 and t2, the mobile station 100 keeps its standby state (discontinuous reception state) after the timings of t1 and t2. Since a paging signal to the own mobile station is included in a signal received and demodulated at timing of t3 by the mobile station 100, the mobile station 100 starts connection request process based on the paging signal so that the state changes to a continuous reception state. The mobile station 100 may start the connection request process by responding a signal such as a paging response in response to the paging signal addressed to the own mobile station. In the example shown in the figure, the radio access network apparatus 200 does not send the occurring paging signal immediately to the mobile station 100, but the radio access network apparatus 200 buffers the paging signal in synchronization with the discontinuous reception cycle so as to transmit the paging signal based on the timing t3.

Although FIG. 6 shows that the discontinuous reception timing arises every eight transmission time intervals (TTI) for the sake of simplicity for drawing, various discontinuous reception cycles may be set periodically or irregularly.

Figure 7:
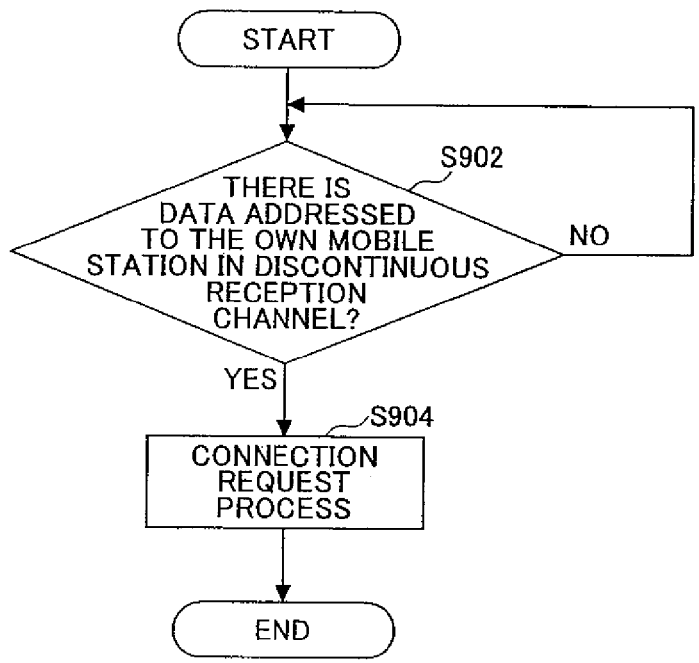
FIG. 7 is a flowchart showing an operation example of a mobile station according to an embodiment of the present invention.

FIG. 7 shows an operation example of a mobile station in a discontinuous reception state. When entering in the discontinuous reception state, the mobile station receives announcement of discontinuous reception information, from the radio access network apparatus, including shared data channel used for discontinuous reception, discontinuous reception cycle, discontinuous reception timing and the like. After that, the mobile station receives and demodulates the shared data channel using the announced timing or cycle.

In step 902, it is determined whether a paging signal to the own mobile station is included in the demodulated signal. This determination may be performed by determining presence or absence of an identifier that is the same as an identifier of the mobile station, for example. Discontinuous reception and demodulation for the shared data channel continues until the mobile station detects the paging signal to the mobile station. Therefore, when the determination result in step 902 indicates that there is no data addressed to the own mobile station (NO), the flow returns to step 902. This operation corresponds to operation at timings of t1 and t2 shown in FIG. 6.

On the other hand, when the paging signal addressed to the own mobile station is detected, the flow goes to step 904, so that the mobile station starts the connection request process. This operation corresponds to operation at the timing of t3 shown in FIG. 6.

As mentioned above, the connection request process may be performed based on that a signal corresponding to a paging response is returned from the mobile station 100 to the radio access network apparatus. After that, downlink data transmission is performed from the radio access network apparatus 200. Since the downlink data transmission is also performed using a shared data channel, a shared data channel the same as one used for transmitting the paging signal to the mobile station 100 may be used for the downlink data transmission.

According to a conventional method, when the mobile station changes from the discontinuous reception state to the continuous reception state, paging is performed using a common control channel, and after that, dedicated channel setting is performed using a common channel and data transmission is performed using the dedicated channel. On the other hand, according to the present embodiment, such channel switching is unnecessary.

Figure 8:
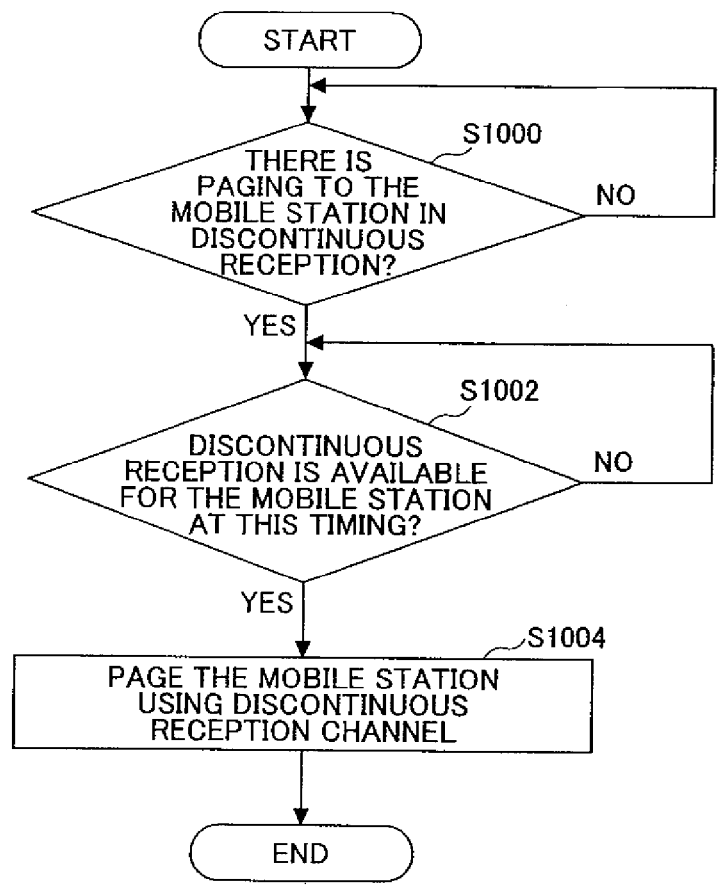
FIG. 8 is a flowchart showing an operation example of a radio access network apparatus according to an embodiment of the present invention.

FIG. 8 shows an operation example of the radio access network apparatus 200 shown in FIG. 4. The operation example shown in the figure is an operation example for the mobile station 100 in a discontinuous reception state. In step 1000, the shared data channel control unit 204 of the radio access network apparatus 200 checks whether a paging signal addressed to the mobile station 100 is arriving from an upper network side. When the paging signal is not arriving, the flow returns to step 1000. That is, the flow waits until the paging signal arrives.

When the paging signal arrives, in step 1002, it is determined whether the current time is a timing at which announcement to the mobile station 100 is available. When the current time is not the timing, the flow waits until the timing comes. When it becomes the timing at which announcement to the mobile station 100 is available, that is, when it becomes the timing at which the mobile station 100 can receive a signal, the paging signal is announced to the mobile station 100 in step 1004 using a shared data channel that is announced beforehand, and after that, connection process and the like is performed, so that the flow for the mobile station in the standby state ends.

INDUSTRIAL APPLICABILITY

The present invention can be applied to a mobile station in a mobile communication system, a radio access network apparatus, the mobile communication system itself and a communication method.

The present application claims priority based on Japanese patent application No. 2005-224720, filed in the JPO on Aug. 2, 2005 and the entire contents of the Japanese patent application No. 2005-224720 are incorporated herein by reference.

The invention claimed is:

1. A radio access network apparatus comprising:
   a discontinuous reception management unit configured to manage a reception state of a discontinuous reception state or a continuous reception state for each of one or more mobile stations;
   a determination and announcement unit configured to determine and announce a correspondence relationship between a discontinuous reception channel and a shared data channel for each mobile station; and
   a scheduling unit configured to perform scheduling of a downlink shared data channel,
   wherein, when a paging signal to the mobile station in the discontinuous reception state occurs, the radio access network apparatus transmits the paging signal to the mobile station using the shared data channel determined based on the correspondence relationship, and, after the radio access network apparatus transmits the paging signal to the mobile station and a signal corresponding to a paging response is returned from the mobile station to the radio access network apparatus as a connection request, the radio access network apparatus performs downlink data transmission by using the shared data channel that is the same as the shared data channel used for transmitting the paging signal to the mobile station.

2. The radio access network apparatus as claimed in claim 1, wherein, when the paging signal to the mobile station in the discontinuous reception state is not occurring, the shared data channel associated with the mobile station based on the correspondence relationship is used for transmission to another mobile station.

3. The radio access network apparatus as claimed in claim 1, wherein a part of shared data channels prepared for a communication system is associated with the discontinuous reception channel.

4. The radio access network apparatus as claimed in claim 1, wherein the radio access network apparatus comprises a radio network controller and a radio base station, and the unit configured to perform scheduling is provided in the radio base station.

5. A mobile station that communicates with a radio access network, comprising:
   a data reception unit configured to discontinuously receive a signal in a standby state; and
   a determination unit configured to determine whether a signal that is received discontinuously includes a paging signal addressed to the mobile station,
   wherein the discontinuous signal reception is performed using a shared data channel specified by a notification signal from the radio access network, and, after the radio access network apparatus transmits the paging signal to the mobile station and a signal corresponding to a paging response is returned from the mobile station to the radio access network apparatus as a connection request, the radio access network apparatus performs downlink data transmission by using the shared data channel that is the same as the shared data channel used for transmitting the paging signal to the mobile station.

6. A method, wherein
   a correspondence relationship between a discontinuous reception channel and a shared data channel is determined by a radio access network apparatus for each mobile station, and the correspondence relationship is announced to the mobile station;

when a paging signal to a mobile station in a discontinuous reception state occurs, the paging signal is transmitted to the mobile station by the radio access network apparatus using a shared data channel determined based on the correspondence relationship, and, after the radio access network apparatus transmits the paging signal to the mobile station and a signal corresponding to a paging response is returned from the mobile station to the radio access network apparatus as a connection request, the radio access network apparatus performs downlink data transmission by using the shared data channel that is the same as the shared data channel used for transmitting the paging signal to the mobile station; and when the mobile station receives the paging signal, the mobile station is changed to a state in which the mobile station continuously receives the shared data channel.

* * * * *